(12) United States Patent
Manolakos et al.

(10) Patent No.: US 11,070,259 B2
(45) Date of Patent: Jul. 20, 2021

(54) FREQUENCY / TIME SELECTIVE PRECODING FOR POSITIONING REFERENCE SIGNALS

(71) Applicant: QUALCOMM Incorporated, San Diego, CA (US)

(72) Inventors: Alexandros Manolakos, San Diego, CA (US); Sony Akkarakaran, Poway, CA (US); Joseph Binamira Soriaga, San Diego, CA (US); Tao Luo, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/513,433

(22) Filed: Jul. 16, 2019

(65) Prior Publication Data

US 2020/0028550 A1    Jan. 23, 2020

(30) Foreign Application Priority Data

Jul. 17, 2018   (GR) ............................... 20180100328

(51) Int. Cl.
*H04B 7/0456* (2017.01)
*H04L 5/00* (2006.01)

(52) U.S. Cl.
CPC ......... *H04B 7/0456* (2013.01); *H04L 5/0051* (2013.01); *H04L 5/0082* (2013.01); *H04L 5/0007* (2013.01)

(58) Field of Classification Search
CPC ... H04B 7/0456; H04L 5/0051; H04L 5/0082; H04L 5/0007
See application file for complete search history.

(56) References Cited

U.S. PATENT DOCUMENTS

| 8,982,851 | B2 | 3/2015 | Agrawal et al. |
| 2015/0200753 | A1* | 7/2015 | Agrawal ............... H04L 5/0082 370/312 |

(Continued)

FOREIGN PATENT DOCUMENTS

| WO | 2010080845 A2 | 7/2010 |
| WO | 2017184043 A1 | 10/2017 |

OTHER PUBLICATIONS

International Search Report and Written Opinion—PCT/US2019/042256—ISA/EPO—dated Sep. 27, 2019.

*Primary Examiner* — Habte Mered
(74) *Attorney, Agent, or Firm* — MG-IP Law, P.C.

(57) ABSTRACT

Disclosed are techniques for transmitting and processing reference signals for positioning estimation over a multipath multiple-input multiple-output (MIMO) channel. In aspects, a first node configures first and second reference signal resource sets for transmission of first and second sets of reference signals, wherein the first and second reference signal resource sets occur on first and second subbands of, and/or during first and second time intervals on, the MIMO channel, wherein each reference signal resource in the first and second reference signal resource sets utilize at least first and second MIMO precoders, and transmits, to a second node over the MIMO channel, the first and second sets of reference signals, wherein the first node transmits the first and second sets of reference signals to assist the second node to perform a positioning measurement based on joint processing of the first and second sets of reference signals.

27 Claims, 10 Drawing Sheets

(56) References Cited

U.S. PATENT DOCUMENTS

2017/0289953 A1* 10/2017 Chae .................... G01S 1/02
2019/0068315 A1* 2/2019 Ryden .................. G01S 1/042

* cited by examiner

FREQUENCY / TIME SELECTIVE PRECODING FOR POSITIONING REFERENCE SIGNALS

CROSS-REFERENCE TO RELATED APPLICATION

The present application for patent claims priority under 35 U.S.C. § 119 to Greek Patent Application No. 20180100328, entitled "FREQUENCY/TIME SELECTIVE PRECODING FOR POSITIONING REFERENCE SIGNALS IN NEW RADIO," filed Jul. 17, 2018, assigned to the assignee hereof, and expressly incorporated herein by reference in its entirety.

TECHNICAL FIELD

Various aspects described herein generally relate to wireless communication systems, and more particularly, to frequency/time selective precoding for positioning reference signals.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 gigahertz (GHz)). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 decibels (dB), relative to that observed in either the 2.4 GHz, or 5 GHz bands.

Propagation loss is also an issue in multiple input-multiple output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To support position estimations in terrestrial wireless networks, a mobile device can be configured to measure and report the observed time difference of arrival ("OTDOA"; OTDOA is also referred to simply as "time difference of arrival" or "TDOA") or reference signal timing difference (RSTD) between reference RF signals received from two or more network nodes (e.g., different base stations or different transmission points (e.g., antennas) belonging to the same base station). For OTDOA-based positioning to be accurate, the receiver needs to be able to accurately estimate the LOS, or earliest, path of the channel. Due to blockages (e.g., hills, buildings, water, etc.), however, RF signals on the LOS path may be received with significantly lower power than RF signals on other non-LOS (NLOS) paths (multipaths). The receiver may therefore erroneously consider that any of these NLOS paths is the LOS path.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for transmitting reference signals for positioning estimation over a multipath MIMO channel includes configuring, by a first node, a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least a first MIMO precoder; configuring, by the first node, a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least a second MIMO precoder; transmitting, by the first node to a second node over the MIMO channel, the first set of reference signals using the first reference signal resource set on the first subband of the MIMO channel and/or during the first time interval on the MIMO channel; and transmitting, by the first node to the second node over the MIMO channel, the second set of reference signals using the second reference signal resource set on the second subband of the MIMO channel and/or during the second time interval on the MIMO channel, wherein the first node transmits the first and second sets of reference signals to assist the second node to perform a positioning measurement based on joint processing of the first and second sets of reference signals.

In an aspect, a method for processing reference signals for positioning estimation over a multipath MIMO channel includes receiving, from a first node by a second node, a first set of reference signals on a first reference signal resource set, wherein the first reference signal resource set occurs on a first subband of the MIMO channel and/or during a first time interval on the MIMO channel, and wherein each reference signal resource in the first reference signal resource set utilizes at least a first MIMO precoder; receiving, from the first node by the second node, a second set of reference signals on a second reference signal resource set, wherein the second reference signal resource set occurs on a second subband of the MIMO channel and/or during a second time interval on the MIMO channel, and wherein each reference signal resource in the second reference signal resource set utilizes at least a second MIMO precoder; identifying, by the second node, at least one reference signal transmitted on the first and second reference signal resource sets as following a LOS path between the second node and the first node; and performing, by the second node, a time difference of arrival (TDOA) measurement based on the at least one reference signal.

In an aspect, an apparatus for transmitting reference signals for positioning estimation over a multipath MIMO channel includes at least one processor of a first node configured to: configure a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least a first MIMO precoder; and configure a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least a second MIMO precoder; and a transmitter of the first node configured to: transmit, to a second node over the MIMO channel, the first set of reference signals using the first reference signal resource set on the first subband of the MIMO channel and/or during the first time interval on the MIMO channel; and transmit, to the second node over the MIMO channel, the second set of reference signals using the second reference signal resource set on the second subband of the MIMO channel and/or during the second time interval on the MIMO channel, wherein the first node transmits the first and second sets of reference signals to assist the second node to perform a positioning measurement based on joint processing of the first and second sets of reference signals.

In an aspect, an apparatus for processing reference signals for positioning estimation over a multipath MIMO channel includes a transceiver of a second node configured to: receive, from a first node, a first set of reference signals on a first reference signal resource set, wherein the first reference signal resource set occurs on a first subband of the MIMO channel and/or during a first time interval on the MIMO channel, and wherein each reference signal resource in the first reference signal resource set utilizes at least a first MIMO precoder; and receive, from the first node, a second set of reference signals on a second reference signal resource set, wherein the second reference signal resource set occurs on a second subband of the MIMO channel and/or during a second time interval on the MIMO channel, and wherein each reference signal resource in the second reference signal resource set utilizes at least a second MIMO precoder; and at least one processor of the second node configured to: identify at least one reference signal transmitted on the first and second reference signal resource sets as following a LOS path between the second node and the first node; and perform, by the second node, a TDOA measurement based on the at least one reference signal.

In an aspect, an apparatus for transmitting reference signals for positioning estimation over a multipath MIMO channel includes a means for processing of a first node configured to: configure a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least a first MIMO precoder; and configure a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least a second MIMO precoder; and a means for communicating of the first node configured to: transmit, to a second node over the MIMO channel, the first set of reference signals using the first reference signal resource set on the first subband of the MIMO channel and/or during the first time interval on the MIMO channel; and transmit, to the second node over the MIMO channel, the second set of reference signals using the second reference signal resource set on the second subband of the MIMO channel and/or during the second time interval on the MIMO channel, wherein the first node transmits the first and second sets of reference signals to assist the second node to perform a positioning measurement based on joint processing of the first and second sets of reference signals.

In an aspect, an apparatus for processing reference signals for positioning estimation over a multipath MIMO channel includes a means for communicating of a second node configured to: receive, from a first node, a first set of reference signals on a first reference signal resource set, wherein the first reference signal resource set occurs on a first subband of the MIMO channel and/or during a first time interval on the MIMO channel, and wherein each reference signal resource in the first reference signal resource set utilizes at least a first MIMO precoder; and receive, from the first node, a second set of reference signals on a second reference signal resource set, wherein the second reference signal resource set occurs on a second subband of the MIMO channel and/or during a second time interval on the MIMO channel, and wherein each reference signal resource in the second reference signal resource set utilizes at least a second MIMO precoder; and a means for processing of the second node configured to: identify at least one reference signal transmitted on the first and second reference signal resource sets as following a LOS path between the second node and the first node; and perform, by the second node, a TDOA measurement based on the at least one reference signal.

In an aspect, a non-transitory computer-readable medium storing computer-executable instructions for transmitting reference signals for positioning estimation over a multipath MIMO channel includes computer-executable instructions comprising at least one instruction instructing a first node to configure a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least a first MIMO precoder; at least one instruction instructing the first node to configure a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least a second MIMO precoder; at least one instruction instructing the first node to transmit, to a second node over the MIMO channel, the first set of reference signals using the first reference signal resource set on the first subband of the MIMO channel and/or during the first time interval on the MIMO channel; and at least one instruction instructing the first node to transmit, to the second node over the MIMO channel, the second set of reference signals using the second reference signal resource set on the second subband of the MIMO channel and/or during the second time interval on the MIMO channel, wherein the first node transmits the first and second sets of reference signals to assist the second node to perform a positioning measurement based on joint processing of the first and second sets of reference signals.

In an aspect, a non-transitory computer-readable medium storing computer-executable instructions for transmitting reference signals for positioning estimation over a multipath MIMO channel includes computer-executable instructions comprising at least one instruction instructing a second node to receive, from a first node, a first set of reference signals on a first reference signal resource set, wherein the first reference signal resource set occurs on a first subband of the MIMO channel and/or during a first time interval on the MIMO channel, and wherein each reference signal resource in the first reference signal resource set utilizes at least a first MIMO precoder; at least one instruction instructing the second node to receive, from the first node, a second set of reference signals on a second reference signal resource set, wherein the second reference signal resource set occurs on a second subband of the MIMO channel and/or during a second time interval on the MIMO channel, and wherein each reference signal resource in the second reference signal resource set utilizes at least a second MIMO precoder; at least one instruction instructing the second node to identify at least one reference signal transmitted on the first and second reference signal resource sets as following a LOS path between the second node and the first node; and at least one instruction instructing the second node to perform a TDOA measurement based on the at least one reference signal.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
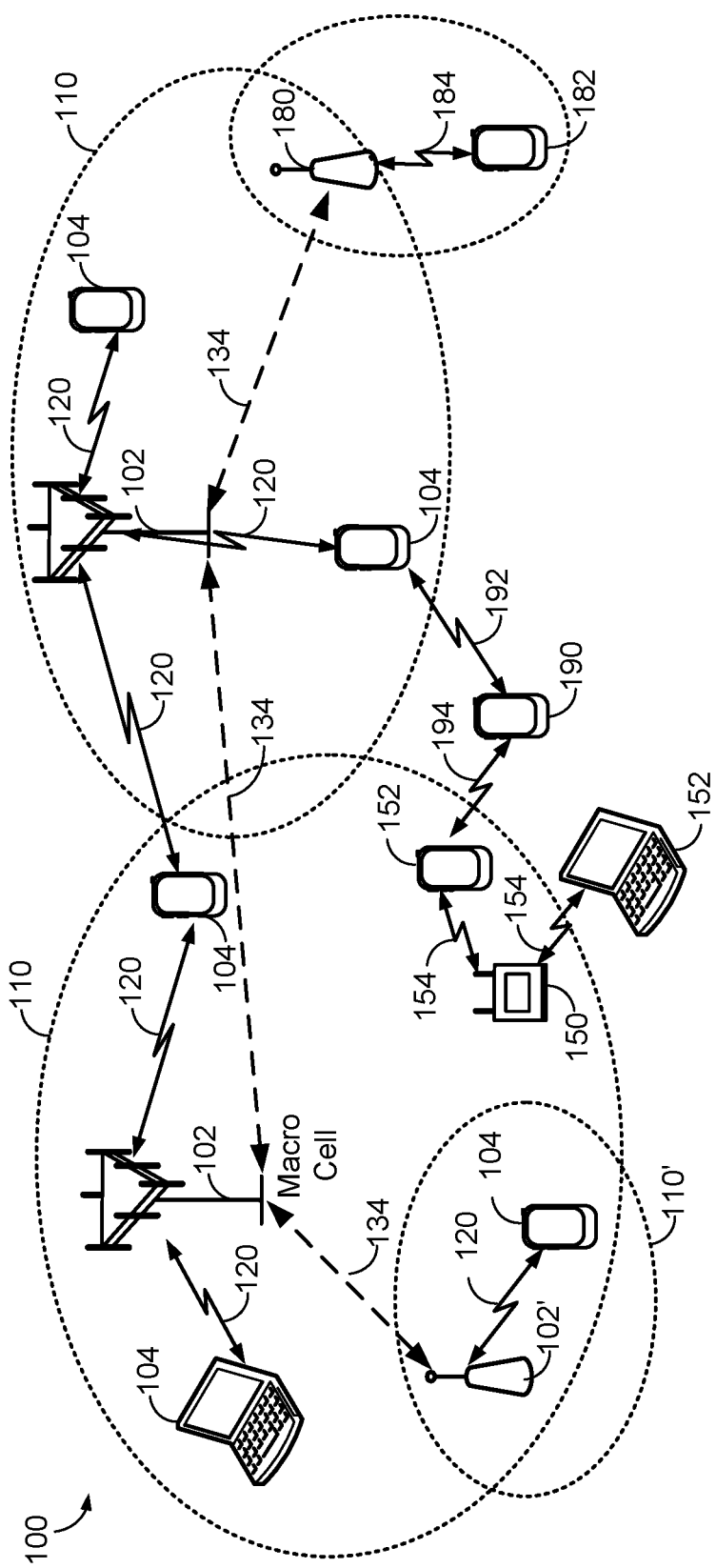
FIG. 1 illustrates an exemplary wireless communications system, according to various aspects.

Various aspects described herein generally relate to wireless communication systems, and more particularly, to frequency/time selective precoding for positioning reference signals in 5G NR.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire®.

Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The wireless communications system 100 may further include a mmW base station 180 that may operate in mmW frequencies and/or near mmW frequencies in communication with a UE 182. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connect indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Figure 2A:
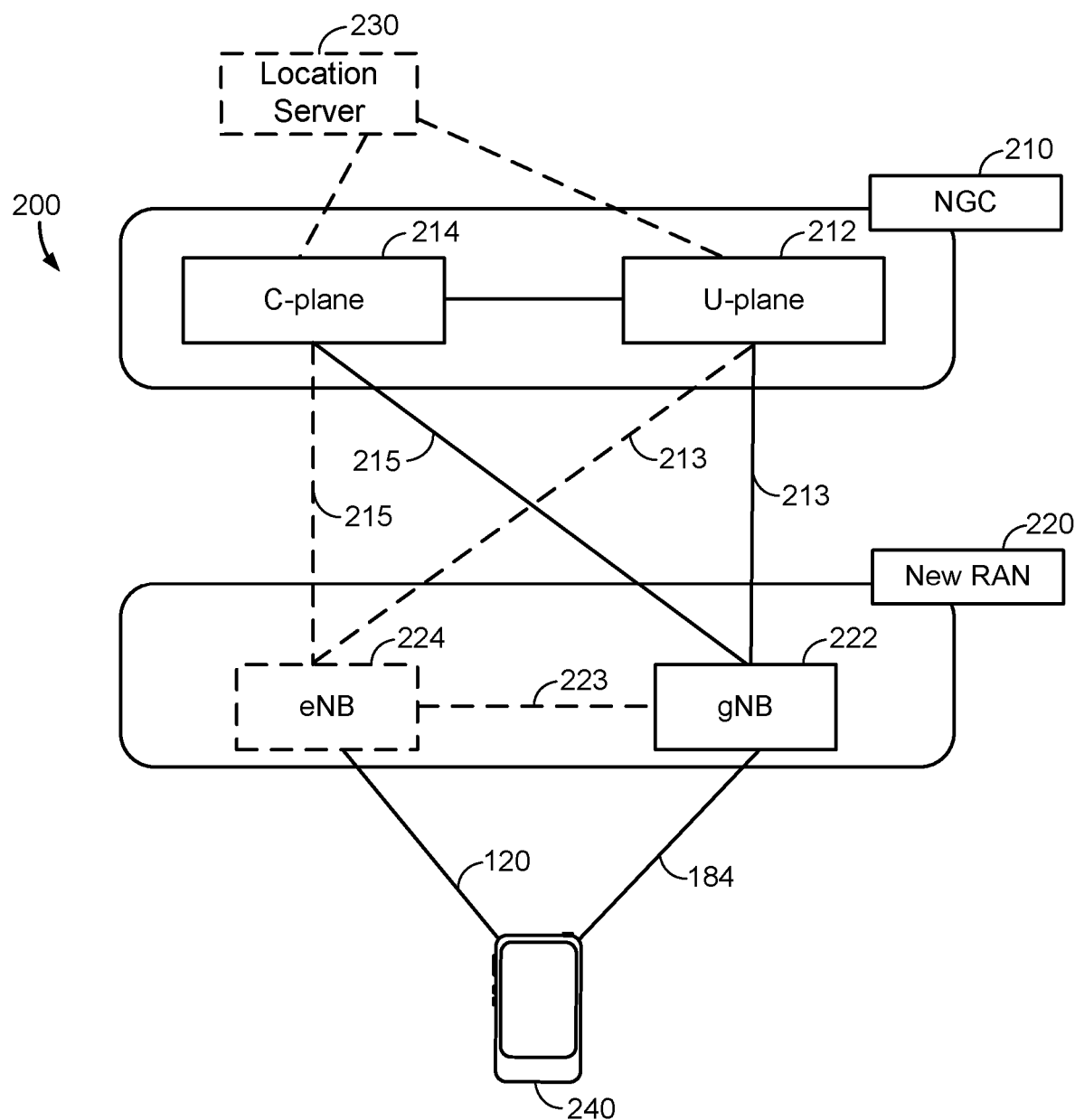
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
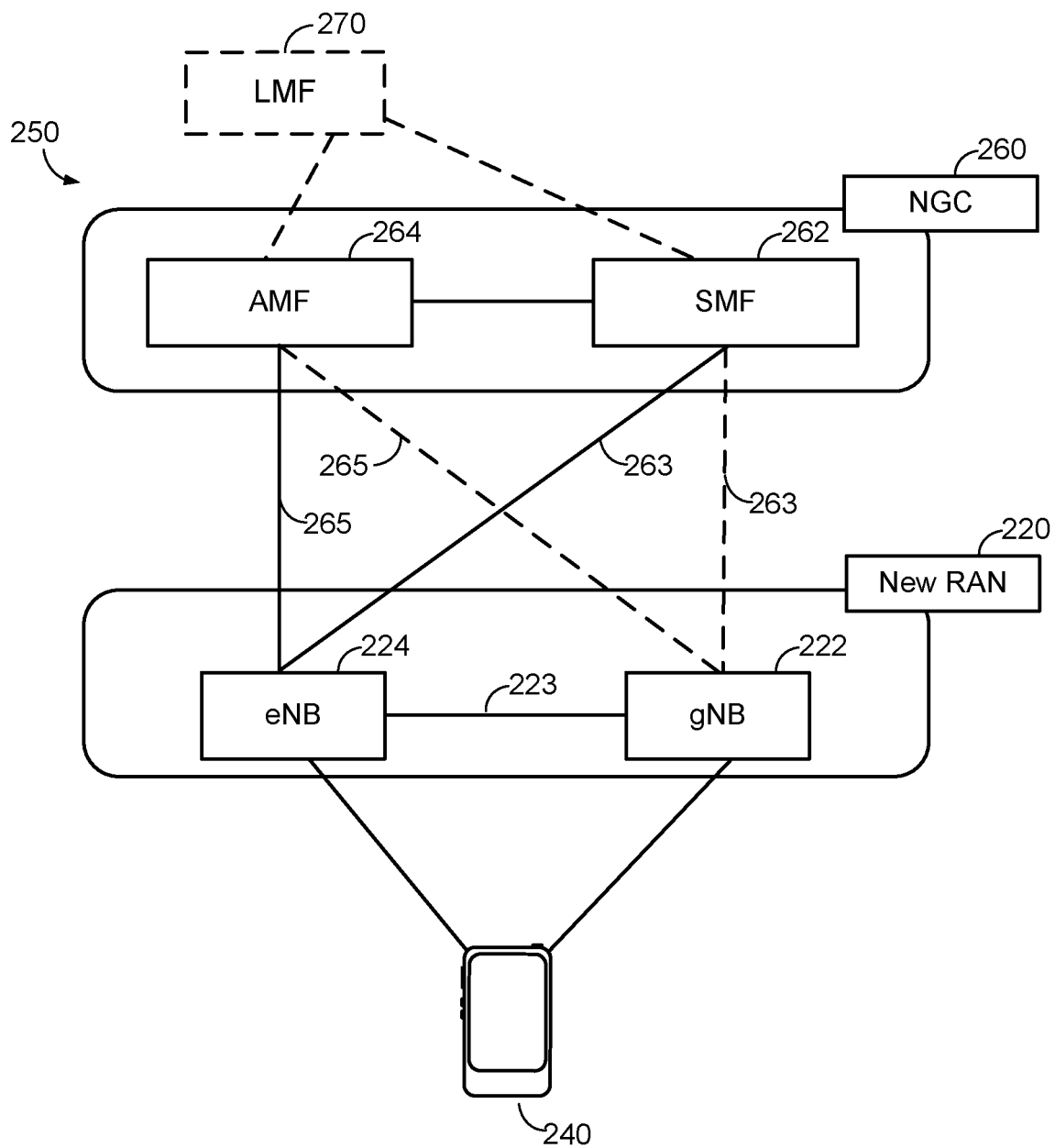

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
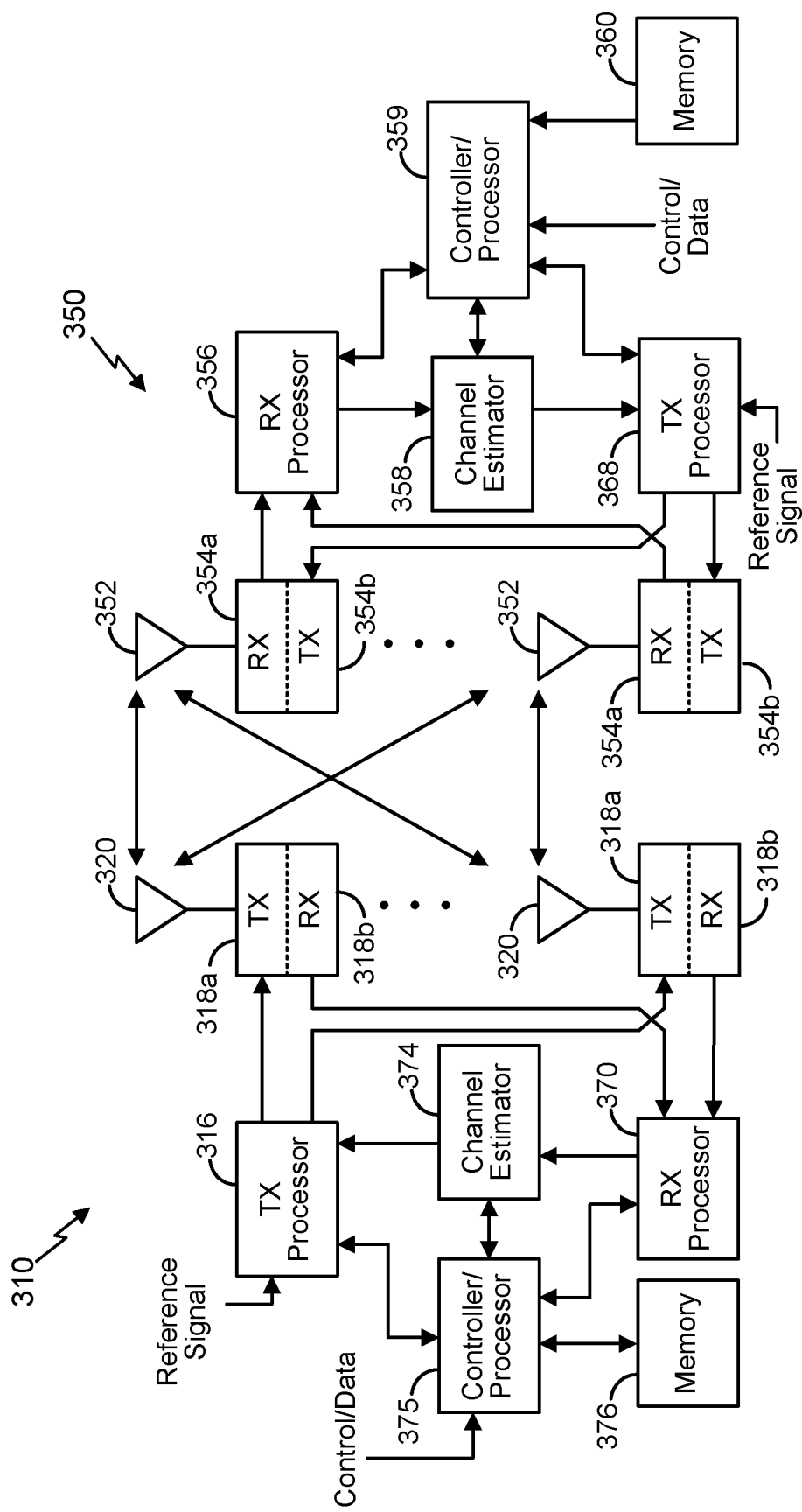
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network, according to aspects of the disclosure. The base station 310 may correspond to any of the base stations described herein. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a TX MIMO processor (described further below with reference to FIG. 7) and from there to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a non-transitory computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to an optional TX MIMO processor (described further below), and from there to different antennas 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The controller/processor 375 can be associated with a memory 376 that stores program codes and data. The memory 376 may be referred to as a non-transitory computer-readable medium. In the UL, the controller/processor 375 provides demultiplexing between transport and logical channels, packet reassembly, deciphering, header decompression, control signal processing to recover IP packets from the UE 304. IP packets from the controller/processor 375 may be provided to the core network. The controller/processor 375 is also responsible for error detection.

Figure 4:
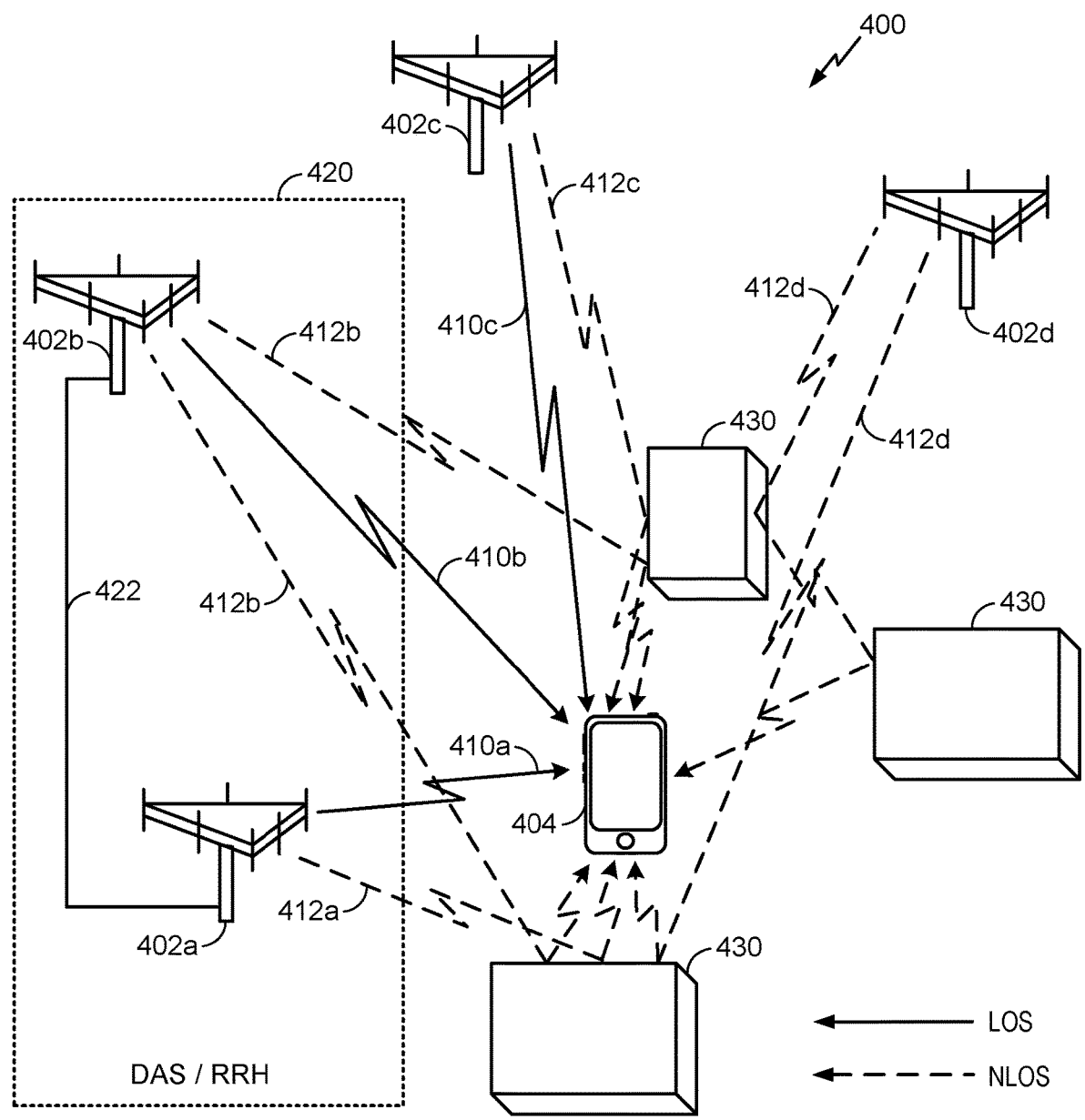
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations' 402 locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference RF signals. Further, as used herein, a "node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. As described further herein, the UE 404 (e.g., based in part on the assistance data, if provided) can measure and (optionally) report the RTT between itself and individual network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE (e.g., UE 404), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as, for example, a "position method" or as a "positioning method." A position estimate may include an expected error or uncertainty (e.g., by including an area or volume within which the location is expected to be included with some specified or default level of confidence).

To support position estimates, the base stations 402 may be configured to broadcast reference RF signals (e.g., positioning reference signals (PRS), cell-specific reference signals (CRS), channel state information reference signals (CSI-RS), narrowband reference signals (NRS), synchronization signals, etc.) to UEs 404 in their coverage area to enable a UE 404 to measure the RTT between the UE 404 and the transmitting base stations 402. In general, the beam of interest for an RTT measurement is the LOS beam, or the beam that excites the shortest RF path (which may be the LOS beam or the NLOS beam following the shortest path to the receiver).

However, RF signals travel not only by the LOS/shortest NLOS path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the received signal received power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. That is, in some cases, the signal strength of RF signals on the LOS path 410 may be weaker (e.g., due to obstructions) than the signal strength of RF signals on an NLOS path 412, over which the RF signals arrive later due to propagation delay.

Figure 5A:
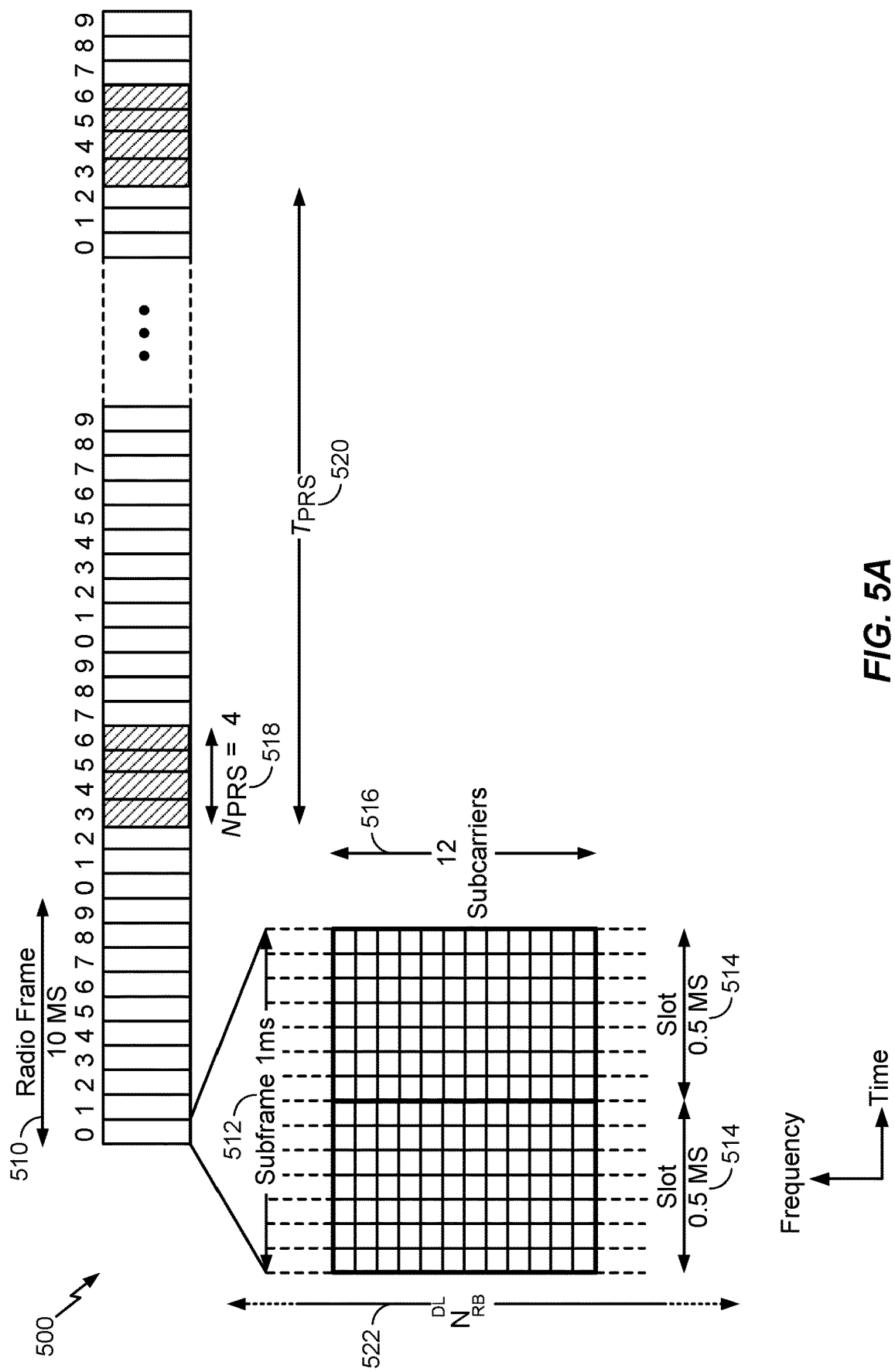
FIG. 5A is a diagram of a structure of an example LTE subframe sequence with PRS positioning occasions.

FIG. 5A shows a structure of an example LTE subframe sequence 500 with PRS positioning occasions. Subframe sequence 500 may be applicable to the broadcast of PRS signals from a base station (e.g., any of the base stations described above) or other network node. While FIG. 5A provides an example of a subframe sequence for LTE, similar subframe sequence implementations may be realized for other communication technologies/protocols, such as 5G and NR. In FIG. 5A, time is represented horizontally (e.g., on the X axis) with time increasing from left to right, while frequency is represented vertically (e.g., on the Y axis) with frequency increasing (or decreasing) from bottom to top. As shown in FIG. 5A, downlink and uplink LTE radio frames 510 may be of 10 millisecond (ms) duration each. For downlink frequency division duplex (FDD) mode, radio frames 510 are organized, in the illustrated example, into ten subframes 512 of 1 ms duration each. Each subframe 512 comprises two slots 514, each of, for example, 0.5 ms duration.

In the frequency domain, the available bandwidth may be divided into uniformly spaced orthogonal subcarriers 516 (also referred to as "tones" or "bins"). For example, for a normal length cyclic prefix (CP) using, for example, 15 kHz spacing, subcarriers 516 may be grouped into a group of twelve (12) subcarriers. A resource of one OFDM symbol length in the time domain and one subcarrier in the frequency domain (represented as a block of subframe 512) is referred to as a resource element (RE). Each grouping of the 12 subcarriers 516 and the 14 OFDM symbols is termed a resource block (RB) or physical resource block (PRB) and, in the example above, the number of subcarriers in the resource block may be written as $N_{SC}^{RB}=12$. For a given channel bandwidth, the number of available resource blocks on each channel 522, which is also called the transmission bandwidth configuration 522, is indicated as $N_{RB}^{DL}$. For example, for a 3 MHz channel bandwidth in the above example, the number of available resource blocks on each channel 522 is given by $N_{RB}^{DL}=15$.

A base station may transmit radio frames (e.g., radio frames 510), or other physical layer signaling sequences, supporting PRS signals (i.e. a downlink (DL) PRS) according to frame configurations either similar to, or the same as that, shown in FIG. 5A, which may be measured and used for a UE (e.g., any of the UEs described above) position determination. Other types of wireless nodes (e.g., a DAS, RRH, UE, AP, etc.) in a wireless communications network may also be configured to transmit PRS signals configured in a manner similar to (or the same as) that depicted in FIG. 5A.

A PRS, which has been defined in 3GPP LTE Release-9 and later releases, may be transmitted by base stations in a wireless communications network after appropriate configuration (e.g., by an operations and maintenance (O&M) server). A PRS may be transmitted in special positioning subframes that are grouped into positioning occasions. For example, in LTE, a PRS positioning occasion can comprise a number $N_{PRS}$ of consecutive positioning subframes, where the number $N_{PRS}$ may be between 1 and 160 (e.g., may include the values 1, 2, 4 and 6 as well as other values). The PRS positioning occasions for a cell supported by a base station may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 5A illustrates a periodicity of positioning occasions where $N_{PRS}$ equals 4 518 and $T_{PRS}$ is greater than or equal to 20 520. In some aspects, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and RSTD measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift, in LTE for example, is defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles. Further enhancements of a PRS may also be supported by a base station.

To assist positioning operations, OTDOA assistance data may be provided to a UE by a location server (e.g., location server 230) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method. PRS-based positioning by a UE may be facilitated by indicating the serving cell for the UE in the OTDOA assistance data (e.g., with the reference cell indicated as being the serving cell).

In some cases, OTDOA assistance data may also include "expected RSTD" parameters, which provide the UE with information about the RSTD values the UE is expected to measure at its current location between the reference cell and each neighbor cell, together with an uncertainty of the expected RSTD parameter. The expected RSTD, together with the associated uncertainty, may define a search window for the UE within which the UE is expected to measure the RSTD value. OTDOA assistance information may also include PRS configuration information parameters, which allow a UE to determine when a PRS positioning occasion occurs on signals received from various neighbor cells relative to PRS positioning occasions for the reference cell, and to determine the PRS sequence transmitted from various cells in order to measure a signal TOA or RSTD.

Using the RSTD measurements, the known absolute or relative transmission timing of each cell, and the known position(s) of wireless node physical transmitting antennas for the reference and neighboring cells, the UE's position may be calculated (e.g., by the UE or the location server). More particularly, the RSTD for a neighbor cell k relative to a reference cell Ref may be given as $(TOA_k - TOA_{Ref})$, where the TOA values may be measured modulo one subframe duration (1 ms) to remove the effects of measuring different subframes at different times. TOA measurements for different cells may then be converted to RSTD measurements (e.g., as defined in 3GPP TS 36.214 entitled "Physical layer; Measurements") and sent to the location server by the UE. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE's position may be determined.

Figure 5B:
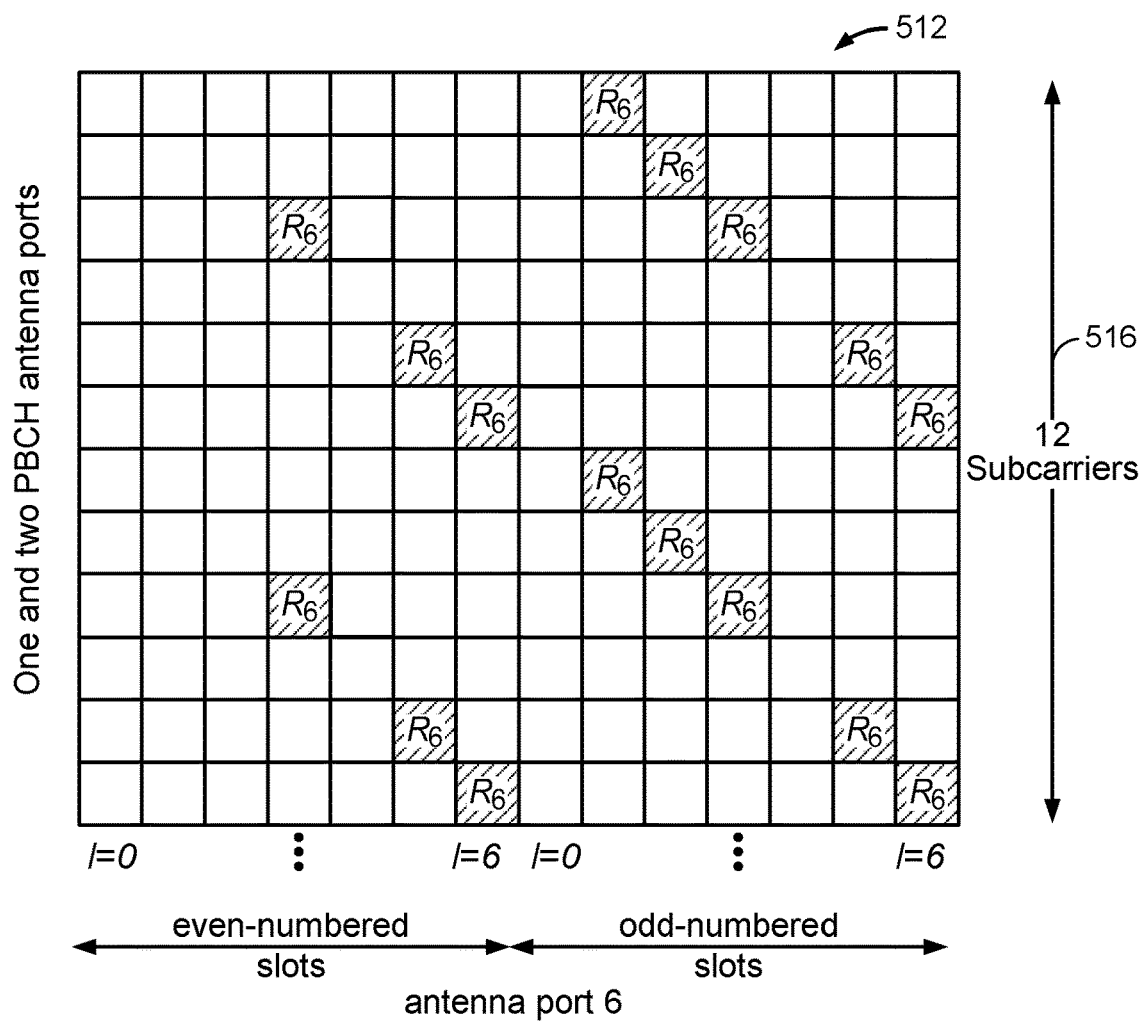
FIG. 5B is a diagram of an exemplary mapping of PRS to resource elements.

In LTE, PRS are transmitted using "antenna port 6," with a specific bandwidth and pattern. The mapping of PRS to resource elements (REs) is shown in FIG. 5B for normal cyclic prefix and one-or-two transmit antenna ports. FIG. 5B illustrates the subframe 512 of 12 subcarriers over 14 OFDM symbols. Each block in FIG. 5B indicates a RE with frequency-domain index k and time-domain index l. The blocks labeled "$R_6$" within the subframe 512 indicate PRS REs.

In LTE, antenna ports do not correspond to physical antennas, but rather, are logical entities distinguished by their reference signal sequences. Thus, multiple antenna port signals can be transmitted on a single transmit antenna, and a single antenna port can be spread across multiple transmit antennas. In some cases, however, such as MIMO systems, each antenna port signal may be transmitted on a separate physical antenna to create spatial diversity between the paths. Table 1 shows a mapping between the types of downlink LTE reference signals and the antenna ports they use. As shown in Table 1, PRS in LTE use antenna port 6.

TABLE 1

| Reference Signal (RS) | Antenna Port(s) | LTE Release |
|---|---|---|
| CRS | 0-3 | 8 |
| Multicast-Broadcast Single-Frequency Network Reference Signals (MBSFN-RS) | 4 | 8 |
| UE-RS | 5 | 8 |
|  | 5, 7, 8 | 9 |
|  | 5, 7-14 | 10 |
| PRS | 6 | 9 |
| CSI-RS | 15-22 | 10 |

Figure 6:
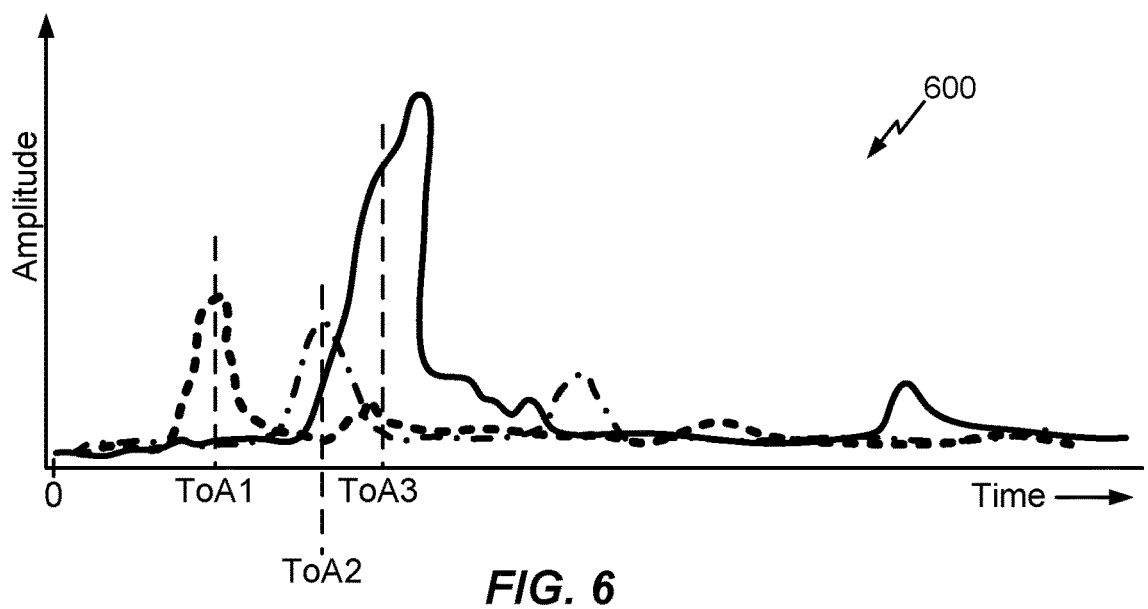
FIG. 6 is a graph showing the RF channel response at a UE over time according to aspects of the disclosure.

Referring back to FIG. 5B, a UE can process all the REs on the bandwidth jointly, and perform an inverse Fourier transform to convert the received signals to the time domain and thereby identify the earliest path on the channel. The UE creates the channel energy response (CER), a graph 600 of which is illustrated in FIG. 6, and identifies the earliest peak. As illustrated in FIG. 6, the UE detects a first CER peak at ToA1, a second CER peak at ToA2, and a third CER peak at ToA3. The first CER peak detected at ToA1 corresponds to the earliest arriving reference RF signal. Thus, the received reference RF signal corresponding to the CER peak at ToA1 is assumed to follow the LOS path.

The ToA $T_i$ at the UE for the shortest path from a cell i is represented as:

$$T_i = \tau_i + \frac{D_i}{c}$$

where $\tau_i$ is the sum of the transmission time from the cell i, the NLOS transmission time, and the UE timing measurement noise, $D_i$ is the Euclidean distance between cell i at location ($q_i$) and the UE at location (p), and c is the speed of light in the air (i.e., 299,700 km/s). It can be assumed that cell location $q_i$ is known through a cell information database. $T_i$ can be estimated using the PRS.

The following is the equation used to calculate the Euclidean distance:

$$c(T_k - \tau_k) = \sqrt{2}\, R\sqrt{1 - \sin(\varphi_1)\sin(\varphi_2) - \cos(\varphi_1)\cos(\varphi_2)\cos(\beta_1 - \beta_2)}$$

where D is the distance between two points on the surface of the earth, R is the radius of the earth (i.e., 6371 km), $\varphi_1$ and $\varphi_2$ are the latitude (in radians) of the first point and the latitude (in radians) of the second point, respectively, and $\beta_1$ and $\beta_2$ are the longitude (in radians) of the first point and the latitude (in radians) of the second point, respectively.

As noted above, 5G NR implementations are designed to significantly enhance the spectral efficiency of mobile communications compared to the current 4G/LTE standard. Furthermore, signaling efficiencies should be enhanced and latency should be substantially reduced compared to current standards. Referring to positioning reference signals in 5G (sometimes referred to as navigation reference signals (NRS)) specifically, there are a number of design goals. For example, NRS should allow the receiver (e.g., a UE) to take accurate measurements that are robust to multipath. NRS should be able to provide navigation and positioning support, such as range, pseudorange, and angle measurements for positioning, and Doppler measurements for velocity estimation and navigation. Another design goal is that NRS should also have a unified and independent signal structure that allows for independence of the cycle prefix (CP), antenna port numbers, and native symbol length, which can be supported by service multiplexing. Additionally, only NRS should be permitted within the NRS envelope, i.e., not intermixed with CRS, tracking reference signals (TRS), primary synchronization signals (PSS), secondary synchronization signals (SSS), physical broadcast channels (PBCH), etc. Yet another design goal is for NRS to provide a high level of orthogonality/isolation among cells, which will help alleviate the "near-far" problem (a receiver needs to be able to distinguish between near and far transmitters; however, the near transmitter can overpower the far transmitter, especially when they operate on the same channel, making it difficult or impossible for the receiver to receive the far transmitter). Thus, NRS should provide for time-frequency orthogonality, code isolation, and antenna-pattern isolation. Yet another design goal is that NRS should require low power consumption at the receiver.

As noted above, to support position estimations in terrestrial wireless networks, a UE can be configured to measure and report the OTDOA or RSTD between reference RF signals (e.g., PRS, NRS, etc.) received from two or more network nodes (e.g., different base stations or different transmission points (e.g., antennas) belonging to the same base station). For OTDOA-based positioning to be accurate, the UE needs to be able to accurately estimate the LOS, or earliest, path of the channel. Due to blockages (e.g., hills, buildings, water, etc.), however, RF signals on the LOS path may be received with significantly lower power than RF signals on other NLOS paths, and therefore be essentially "hidden" from the UE. The UE may therefore erroneously consider that one of the NLOS paths is the LOS path.

To better distinguish between LOS and NLOS paths, the present disclosure provides techniques for introducing frequency and/or time diversity for reference RF signals used for positioning (such as NRS in 5G NR). In an aspect, a reference RF signal may be transmitted with a different MIMO precoder in each frequency subband or in each time interval to enable the transmitter (e.g., a base station) to adjust the measured CER at the receiver (e.g., a UE) in an attempt to make the detection of the earliest path of the channel easier and more robust. Using a frequency selective precoder may result in smoothing the strong NLOS paths and making the LOS path more easily detectable. More specifically, if the precoders in the frequency domain adjust, the corresponding time domain impulse response of the channel will be convolved with the time domain impulse response of the precoders. This may result in smoothing out the NLOS path(s) more than would occur for the LOS path. Thus, the NLOS path(s) may not be persistent when the precoder adjusts. The receiver may process each measurement inside a constant-precoder frequency/time region independently, and keep track of the main RF signal paths.

In conventional single-stream RF signal transmission, the same RF signal is emitted from each of the transmit antennas with appropriate weighting (phase and gain) such that the signal power is maximized at the receiver. "Precoding" is a technique to determine and apply the appropriate weighting to the RF signal stream based on the channel conditions between the transmitter and receiver. Specifically, the transmitter estimates the channel conditions between itself and the receiver and determines the weighting for each transmit antenna based on the estimated channel conditions. As such, precoding reduces the corrupting effect of the communication channel.

Figure 7:
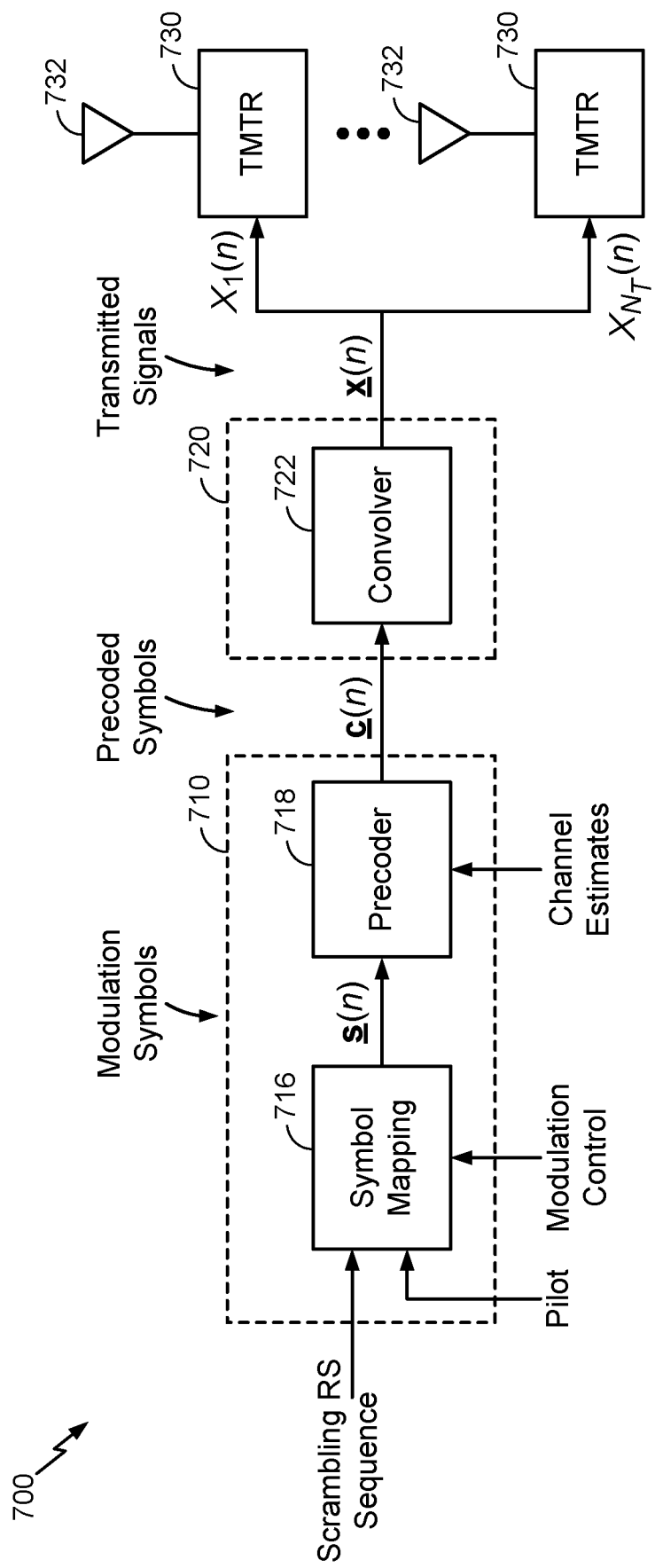
FIG. 7 is a block diagram of an embodiment of a transmitter unit that precodes data for a multipath channel.

FIG. 7 is a block diagram of an exemplary transmitter 700 that precodes data for a multipath channel, according to aspects of the disclosure. The transmitter 700 may correspond to the transmitter portion of the base station 310 or the UE 350 in FIG. 3. Among other components, the transmitter 700 includes a TX processor 710 (which may correspond to TX processor 316 or TX processor 368), which receives and processes traffic and pilot data to provide (up to) $N_T$ precoded symbol streams, and a TX MIMO processor 720, which preconditions the precoded symbol streams to provide (up to) $N_T$ preconditioned symbol streams.

In the example of FIG. 7, the TX processor 710 includes a symbol mapping element 716 and a precoder 718. Symbol mapping element 716 receives and multiplexes pilot data with the scrambling reference RF signal sequence, and further symbol maps the multiplexed data in accordance with one or more modulation schemes to provide modulation symbols. A separate modulation scheme may be used for each data stream or each group of one or more data streams. Alternatively, a common modulation scheme may be used for all data streams. The symbol mapping for each data stream may be achieved by (1) grouping sets of multiplexed data bits to form non-binary symbols and (2) mapping each non-binary symbol to a point in a signal constellation corresponding to the modulation scheme selected for use for that data stream. Each mapped signal point corresponds to a modulation symbol. Symbol mapping element 716 provides a vector of modulation symbols s(n) for each symbol period n, with the number of modulation symbols in each vector being equal to the number of spatial subchannels to be used for that symbol period. Symbol mapping element 716 thus provides (up to) $N_T$ modulation symbol streams (i.e., a sequence of modulation symbol vectors, with each vector including up to $N_T$ modulation symbols).

To perform the precoding at the transmitter 700, the response of the MIMO channel may be estimated (e.g., by channel estimator 374 or channel estimator 358) and used to precode the modulation symbols and to further precondition the precoded symbols prior to transmission over the MIMO channel. In an FDD system, the downlink and uplink are allocated different frequency bands, and the channel responses for the downlink and uplink may not be correlated to a sufficient degree. For the FDD system, the channel response may be estimated at the receiver and sent back to the transmitter. In a time division duplex (TDD) system, however, the downlink and uplink share the same frequency band in a time division multiplexed manner, and a high degree of correlation may exist between the downlink and uplink channel responses. For a TDD system, therefore, the transmitter 700 can estimate the uplink channel response (e.g., based on the pilot transmitted by the receiver system on the uplink) and derive the downlink channel response by accounting for differences between the transmit and receive antenna arrays and front-end processing. However, in some cases, there may not be an estimate of the MIMO channel available to perform the MIMO precoding. Instead, some predetermined or pseudo-random choice of precoding can be used. For example, as described further herein, some precoder granularity, small delay cyclic delay diversity (SDCDD) parameter, pseudo-random seed, precoder cycling ordering, or precoder cycling set can be used.

Precoder 718 receives and precodes the modulation symbol streams s(n) to provide precoded symbol streams c(n). As described further herein, where the RF signal to be transmitted is a reference signal, the precoder 718 may precode the reference signal for different subbands and/or for different time intervals. That is, the different resources carrying the reference RF signal may use different MIMO precoders, and therefore appear to be transmitted on different antenna ports. The TX MIMO processor 720 then performs MIMO processing on the precoded symbol streams c(n) to orthogonalize the symbol streams at the receiver system (e.g., UE 350). As noted above, the MIMO processing may be performed in the time domain or frequency domain.

A convolver 722 receives and preconditions (e.g., convolves) the precoded symbol stream c(n) with a pulse-shaping matrix to derive the transmitted signal vector x(n). Each element of the transmitted signal vector x(n) corresponds to a stream of preconditioned symbols to be transmitted over a respective transmit antenna 732 (which may correspond to transmit antennas 320 or transmit antennas 352). The $N_T$ preconditioned symbol streams (i.e., a sequence of preconditioned symbol vectors, with each vector including up to $N_T$ preconditioned symbols) are also denoted as $N_T$ transmitted signals. The $N_T$ preconditioned symbol streams are provided to transmitters 730 (which may correspond to transmitters 318a or transmitters 354b) and processed to derive $N_T$ modulated signals, which are then transmitted from $N_T$ antennas 732.

As noted above, the present disclosure provides techniques for selectively precoding reference RF signals used for positioning (such as NRS in 5G NR) to introduce frequency and/or time diversity. As noted above, in LTE, PRS are transmitted on antenna port 6, so each PRS would have the same MIMO precoder. However, in the techniques of the present disclosure, the transmitter (e.g., TX processor 710) may configure reference RF signal resources for different subbands and/or for different time intervals, making it appear as if they are transmitted on different antenna ports.

As used herein, a reference RF signal "resource" is a collection of resource elements in the time-frequency grid (as illustrated in FIGS. 5A and 5B) carrying reference RF signals. For example, in LTE, a reference RF signal resource for PRS would be the resource elements of a subframe that carry PRS, labeled in FIG. 5B as "$R_6$." Thus, each resource element of a reference RF signal resource carries a reference RF signal. A "set" of reference RF signal resources refers to a set of such collections of resource elements carrying reference RF signals.

In an aspect, each reference RF signal resource, or set of reference RF signal resources, may use a different MIMO precoder, and therefore appear to be transmitted on a different antenna port from other reference RF signal resources or sets of reference RF signal resources. Alternatively, each resource element of a reference RF signal resource may use a different MIMO precoder. The MIMO precoder may be different for each frequency subband and/or for each time interval in which the (set of) reference RF signal resources are configured. Because the MIMO precoder is different for each reference RF signal resource or set of reference RF signal resources, the receiver (e.g., a UE) cannot infer that a given (set of) reference RF signal resource(s) is being transmitted on the same antenna port or using the same MIMO precoder as another (set of) reference RF signal resource(s) unless they are being transmitted on the same subband or at the same time interval. The receiver can process all the reference RF signals in the (set of) reference RF signal resource(s) to determine which one follows the LOS path.

As an example, a first set of four reference RF signal resources may carry four reference RF signals that would appear to the receiver as having been encoded by a first antenna port or a first MIMO precoder. A second set of four reference RF signals resources may carry four reference RF signals that would appear to the receiver as having been encoded by a different antenna port or a different MIMO precoder. As another example, a first reference RF signal resource may have multiple resource elements carrying reference RF signal that would appear to the receiver as each having been encoded by a different antenna port or a different MIMO precoder. A second reference RF signal resource may have the same configuration of resource elements carrying reference RF signals that would appear to the receiver as each having been encoded by the same antenna ports or the same MIMO precoders as the resource elements in the first reference RF signal resource. That is, the resource elements carrying reference RF signals in a reference RF signal resource would be encoded differently, but the same across multiple reference RF signal resources.

These techniques may be implemented in various ways. In one aspect, each positioning reference RF signal resource may have a configured precoder granularity (PRG) that can be equal to a wideband frequency (in which LTE operates), or a narrowband frequency value. In another aspect, each positioning reference RF signal resource may have a configured time coherency parameter, indicating whether or not the receiver can assume that the antenna port for the positioning reference RF signal resource is the same across the OFDM symbols/slots within that time coherency parameter. For example, if the time coherency parameter is four OFDM symbols, the receiver can assume that reference RF signals transmitted within a group of four symbols use the same antenna port/MIMO precoder, but cannot assume that reference RF signals transmitted within a subsequent group of four symbols use the same antenna port/MIMO precoder as the first group of four symbols. However, the receiver will be able to use the reference RF signals in both symbol groups to determine the LOS path.

In yet another aspect, the receiver may be configured with multiple positioning reference RF signal resources on the same OFDM symbol but in disjoint subbands, and the receiver may report a TDOA estimate after jointly processing these resources. These resources may belong to the same positioning set, and the receiver may report one TDOA estimate across the set. The receiver may also report which reference RF signal resource in the set was used to derive the reported TDOA measurement among all the RS resources of the set. That is, the receiver may determine which reference RF signal resource of the set has the LOS reference RF signal, determine the TDOA using that reference RF signal, and report that reference RF signal resource to the transmitter. The transmitter may then use that reference RF signal resource/MIMO precoder when transmitting reference RF signal to the receiver in the future.

In an aspect, precoder cycling or SDCDD may be used to transmit a positioning reference RF signal resource. In SDCDD, one reference RF signal resource is transmitted with a first predetermined delay, a subsequent reference RF signal resource is transmitted with another predetermined delay, and so on. In that way, the receiver may be able to determine which one uses the LOS path. For precoder cycling, the transmitter uses a different precoder sequence for each of some cycle of precodes (e.g., four precodes) and then repeats. The receiver may be configured with a reference resource and a positioning reference RF signal resource, one of which transmits using an antenna port that is derived using a predefined precoder cycling method with respect to the reference resource. The reference resource may be a synchronization signal block (SSB), a CSI-RS, a TRS, or another positioning reference RF signal resource.

In the above aspects, the receiver may indicate a PRG, or the precoder cyclic sequence, or the time delay to be applied to the SDCDD, or the number of different positioning reference RF signal resources in the set of reference RF signal resources. The receiver's indication(s) may be based on the receiver's capabilities related to the PRG, precoder cyclic sequence, time delay, etc. The receiver's indication(s) may only be applicable in scenarios of receiver-based positioning (where the receiver determines its own position), and not receiver-assisted positioning (where a location server or other network entity determines the position of the receiver). In the case of receiver-assisted positioning, the receiver assumes a wideband precoder is used for the positioning reference RF signal.

Note that although the foregoing description has generally described the transmitter being a base station and the receiver being a UE, as will be appreciated, the transmitter may be a UE and the receiver may be a base station, or both the transmitter and the receiver may be UEs or base stations.

Figure 8:
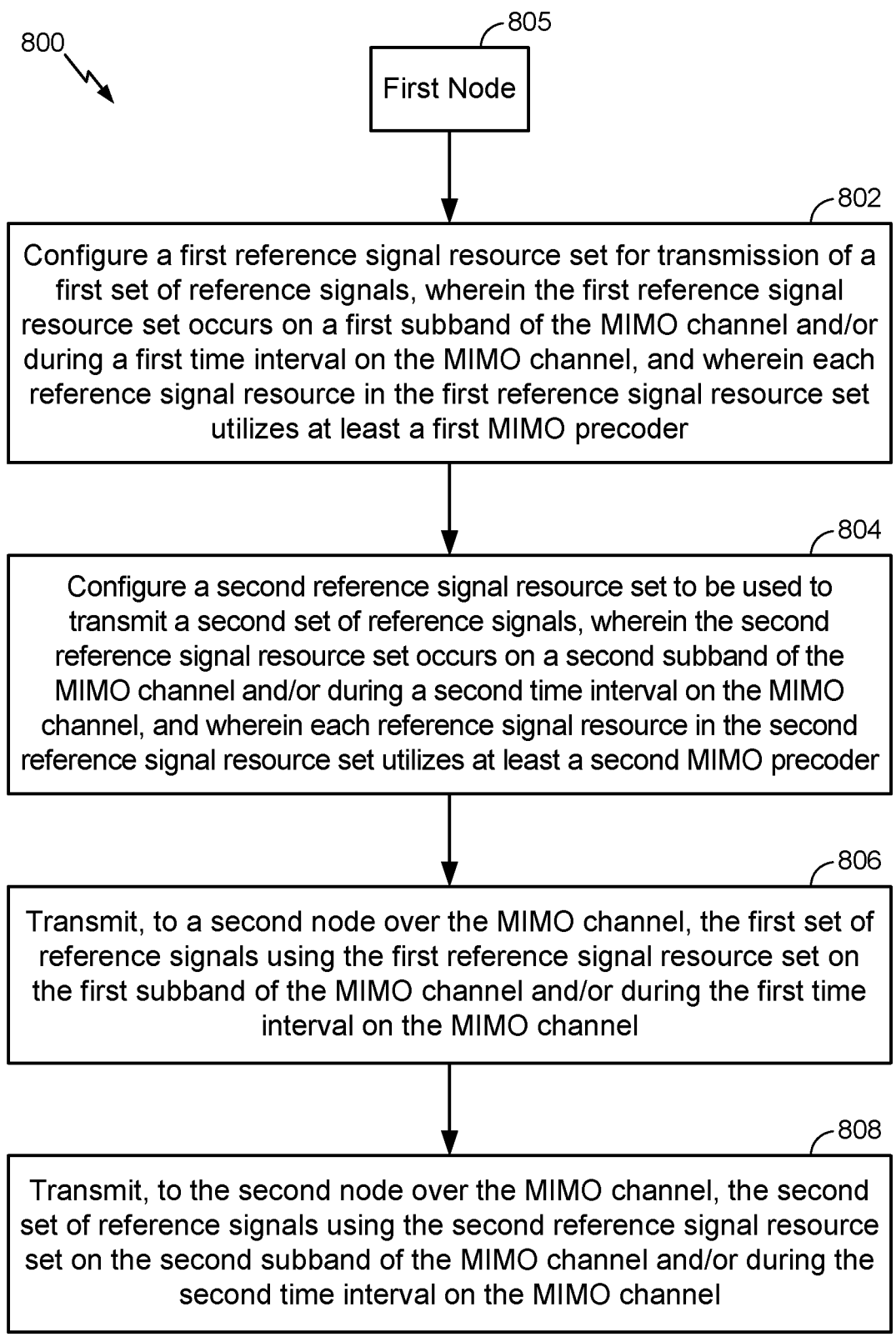
FIGS. 8 and 9 illustrate exemplary methods for transmitting and processing reference signals for positioning estimation over a MIMO channel.

FIG. 8 illustrates an exemplary method 800 for transmitting reference signals for positioning estimation over a MIMO channel according to at least one aspect of the disclosure. The method 800 may be performed by a first node, such as base station 310 or UE 350, having a transmitter 700.

At 802, the first node 805 (e.g., TX processor 710 and/or TX MIMO processor 720) configures a first reference signal resource set (of one or more reference signal resources) for transmission of a first set of (one or more) reference signals. In an aspect, the first reference signal resource set may occur on a first subband of the MIMO channel and/or during a first time interval on the MIMO channel. In an aspect, each reference signal resource in the first reference signal resource set may utilize at least a first MIMO precoder, or multiple MIMO precoders (e.g., a different MIMO precoder for each reference signal resource), as described herein. In an aspect, each reference signal resource in the first reference signal resource set may utilize a first plurality of MIMO precoders, including the first MIMO precoder, that vary over time and/or frequency At 804, the first node 805 (e.g., TX processor 710 and/or TX MIMO processor 720) configures a second reference signal resource set (of one or more reference signal resources) for transmission of a second set of (one or more) reference signals. In an aspect, the second reference signal resource set may occur on a second subband of the MIMO channel and/or during a second time interval on the MIMO channel. In an aspect, each reference signal resource in the second reference signal resource set may utilize at least a second MIMO precoder, or multiple MIMO precoders (e.g., a different MIMO precoder for each reference signal resource), as described herein. In an aspect, each reference signal resource in the second reference signal resource set may utilize a second plurality of MIMO precoders, including the second MIMO precoder, that vary over time and/or frequency. In an aspect, the method 800 may further include receiving, at the first node 805 from the second node, an indication for a number of reference signal resources to include in the first and second reference signal resource sets.

In an aspect, the first and second pluralities of MIMO precoders may vary over time and/or frequency for each reference signal resource in the first and second reference signal resource sets based on a configured precoder granularity. In an aspect, the method 800 may further include receiving, at the first node 805 from the second node, an indication for the configured precoder granularity.

In an aspect, the first and second pluralities of MIMO precoders may vary over time and/or frequency for each reference signal resource in the first and second reference signal resource sets based on a configured time coherency parameter. In an aspect, the method 800 may further include receiving, at the first node 805 from the second node, an indication for the configured time coherency parameter.

In an aspect, the first and second pluralities of MIMO precoders may vary over time and/or frequency for each reference signal resource in the first and second reference signal resource sets based on a configured SDCDD. In an aspect, the method 800 may further include receiving, at the first node 805 from the second node, an indication for the configured SDCDD.

In an aspect, the first and second pluralities of MIMO precoders may vary over time and/or frequency for each reference signal resource in the first and second reference signal resource sets based on a configured precoder cycling set and precoder cycling ordering. In an aspect, the method 800 may further include receiving, at the first node 805 from the second node, an indication for the configured precoder cycling set and precoder cycling ordering.

At 806, the first node 805 (e.g., antenna(s) 732, transmitter(s) 730, TX MIMO processor 720, and/or TX processor 710) transmits, to a second node (e.g., the other of base station 310 or UE 350) over the MIMO channel, the first set of reference signals using the first reference signal resource set on the first subband of the MIMO channel and/or during the first time interval on the MIMO channel.

At 808, the first node 805 (e.g., antenna(s) 732, transmitter(s) 730, TX MIMO processor 720, and/or TX processor 710) transmits, to the second node over the MIMO channel, the second set of reference signals using the second reference signal resource set on the second subband of the MIMO channel and/or during the second time interval on the MIMO channel.

In an aspect, the first reference signal resource set may include multiple reference signal resources on the same OFDM symbol in disjoint subbands of the MIMO channel. In an aspect, the method 800 may further include receiving, at the first node 805 from the second node, TDOA estimates based, at least in part, on the first and second sets of reference signals transmitted on the first and second reference signal resource sets, or receiving, at the first node 805 from the second node, a position estimate of the second node that was calculated based, at least in part, on the first and second sets of reference signals transmitted on the first and second reference signal resource sets. In an aspect, the method 800 may further include receiving, at the first node 805 from the second node, an identifier of a reference signal resource of the first and second reference signal resource sets that was used to derive the TDOA estimates or the position estimate of the second node. In an aspect, the first node 805 uses the identified reference signal resource to transmit subsequent reference signals to the second node.

In an aspect, the first and second MIMO precoders used in each subband of the first and second subbands may be a pseudo-randomly chosen MIMO precoder based on a MIMO precoder cyclic set.

In an aspect, the method 800 may further include receiving, at the first node 805 from the second node, a recommendation of the first and second MIMO precoders to use to encode the first and second reference signal resource sets.

Figure 9:
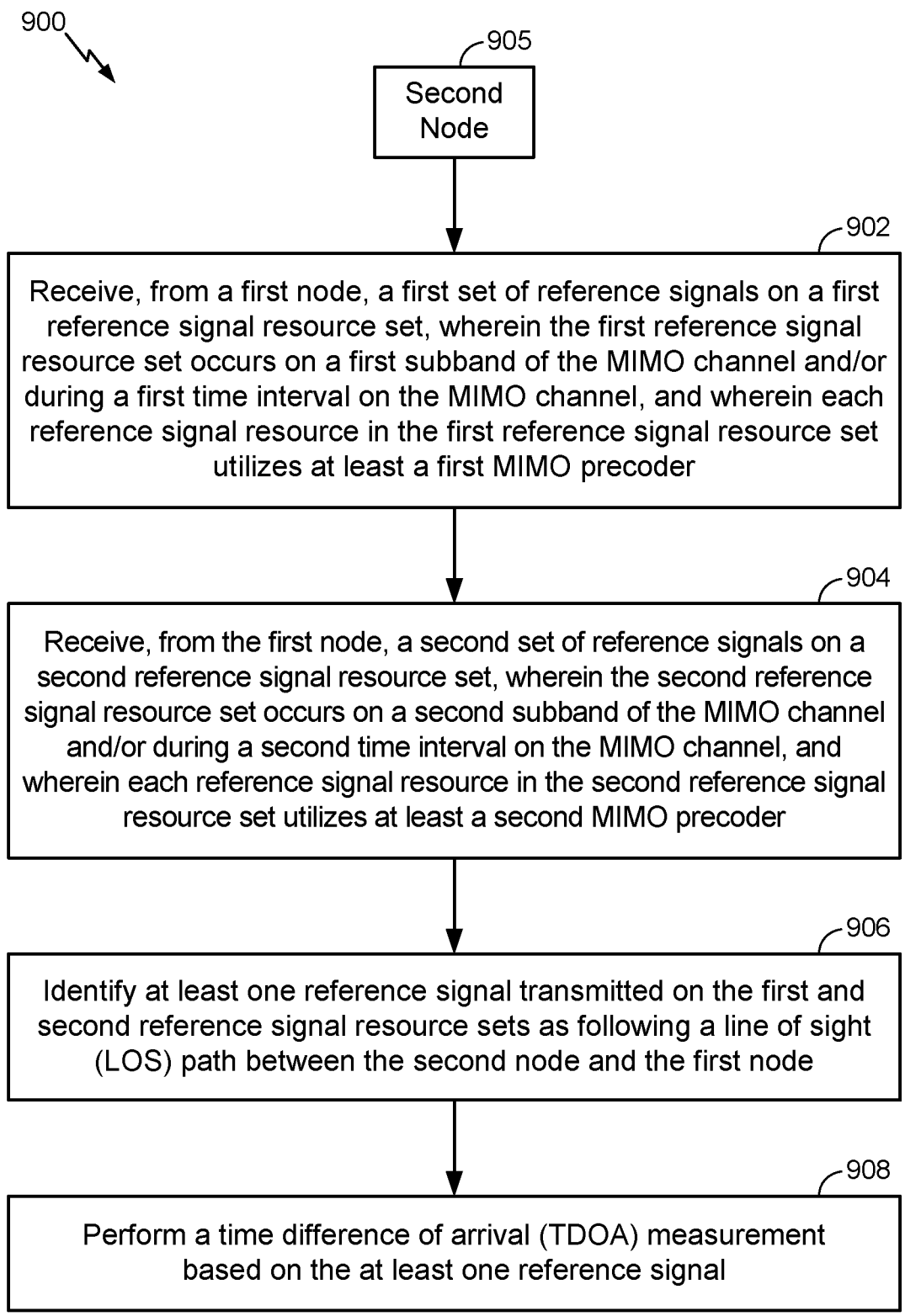

FIG. 9 illustrates an exemplary method 900 for processing reference signals for positioning estimation over a MIMO channel. The method 900 may be performed by a second node 905, such as base station 310 or UE 350.

At 902, the second node 905 (e.g., antenna(s) 320, receiver(s) 318b, and/or RX processor 370, or antenna(s) 352, receiver(s) 354a, and/or RX processor 356) receives, from a first node (e.g., the other of base station 310 or UE 350), a first set of (one or more) reference signals on a first reference signal resource set (of one or more reference signal resources). In an aspect, the first reference signal resource set may occur on a first subband of the MIMO channel and/or during a first time interval on the MIMO channel. In an aspect, each reference signal resource in the first reference signal resource set may utilize at least a first MIMO precoder, or multiple MIMO precoders (e.g., a different MIMO precoder for each reference signal resource), as described herein. In an aspect, each reference signal resource in the first reference signal resource set may utilize a first plurality of MIMO precoders, including the first MIMO precoder, that vary over time and/or frequency.

At 904, the second node 905 (e.g., antenna(s) 320, receiver(s) 318b, and/or RX processor 370, or antenna(s) 352, receiver(s) 354a, and/or RX processor 356) receives, from the first node, a second set of (one or more) reference signals on a second reference signal resource set (of one or more reference signal resources). In an aspect, the second reference signal resource set may occur on a second subband of the MIMO channel and/or during a second time interval on the MIMO channel. In an aspect, each reference signal resource in the second reference signal resource set may utilize at least a second MIMO precoder, or multiple MIMO precoders (e.g., a different MIMO precoder for each reference signal resource), as described herein. In an aspect, each reference signal resource in the second reference signal resource set may utilize a second plurality of MIMO precoders, including the second MIMO precoder, that vary over time and/or frequency.

At 906, the second node 905 (e.g., RX processor 370 and/or controller/processor 375, or RX processor 356 and/or controller/processor 359) identifies at least one reference signal transmitted on the first and second reference signal resource sets as following a LOS path between the second node and the first node.

At 908, the second node 905 (e.g., RX processor 370 and/or controller/processor 375, or RX processor 356 and/or controller/processor 359) performs a TDOA measurement based on the at least one reference signal.

In an aspect, the method 900 may further include sending, to the first node by the second node 905, an indication for a configured precoder granularity, wherein the first and second pluralities of MIMO precoders may vary over time and/or frequency for each reference signal resource in the first and second reference signal resource sets based on the configured precoder granularity.

In an aspect, the method 900 may further include sending, to the first node by the second node 905, an indication of a configured time coherency parameter, wherein the first and second pluralities of MIMO precoders may vary over time and/or frequency for each reference signal resource in the first and second reference signal resource sets based on the configured time coherency parameter.

In an aspect, the method 900 may further include sending, to the first node by the second node 905, an indication for a configured SDCDD, wherein the first and second pluralities of MIMO precoders may vary over time and/or frequency for each reference signal resource in the first and second reference signal resource sets based on the configured SDCDD.

In an aspect, the method 900 may further include sending, to the first node by the second node 905, an indication for a configured precoder cycling set and precoder cycling ordering, wherein the first and second pluralities of MIMO precoders may vary over time and/or frequency for each reference signal resource in the first and second reference signal resource sets based on the configured precoder cycling set and precoder cycling ordering.

In an aspect, the method 900 may further include sending, to the first node by the second node 905, a recommendation of a number of reference signal resources to include in the first reference signal resource set.

In an aspect, the method 900 may further include sending, to the first node by the second node 905, an identifier of the reference signal resource carrying the at least one reference signal that was used to derive the TDOA measurement or a position estimate of the second node that was calculated based, at least in part, on the first and second sets of reference signals transmitted on the first and second reference signal resource sets.

In an aspect, the method 900 may further include sending, to the first node by the second node 905, a recommendation of the first and second MIMO precoders to use to encode the first and second reference signal resource sets.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a compact disk (CD), laser disc, optical disk, digital video disk (DVD), floppy disk, and Blu-ray® discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A transmitter node configured to transmit reference signals for positioning estimation over a multipath multiple-input multiple-output (MIMO) channel, comprising:
a memory;
at least one transceiver; and
at least one processor communicatively coupled to the memory and the at least one transceiver, the at least one processor configured to:
receive, from a receiver node, a recommendation of a first MIMO precoder to use to encode a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least the first MIMO precoder;
receive, from the receiver node, a recommendation of a second MIMO precoder to use to encode a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least the second MIMO precoder;
cause the at least one transceiver to transmit, to the receiver node over the MIMO channel, the first set of reference signals using the first reference signal resource set on the first subband of the MIMO channel and/or during the first time interval on the MIMO channel; and
cause the at least one transceiver to transmit, to the receiver node over the MIMO channel, the second set of reference signals using the second reference signal resource set on the second subband of the MIMO channel and/or during the second time interval on the MIMO channel,
wherein the transmitter node transmits the first and second sets of reference signals to assist the receiver node to perform a positioning measurement based on processing of the first and second sets of reference signals.

2. The transmitter node of claim 1, wherein each reference signal resource in the first reference signal resource set utilizes a first plurality of MIMO precoders, including the first MIMO precoder, that vary over time and/or frequency, and
wherein each reference signal resource in the second reference signal resource set utilizes a second plurality of MIMO precoders, including the second MIMO precoder, that vary over time and/or frequency.

3. The transmitter node of claim 2, wherein the first and second pluralities of MIMO precoders varies over time and/or frequency for each reference signal resource in the first and second reference signal resource sets based on a configured precoder granularity.

4. The transmitter node of claim 3, wherein the at least one processor is further configured to:
receive, from the receiver node, an indication for the configured precoder granularity.

5. The transmitter node of claim 2, wherein the first and second pluralities of MIMO precoders varies over time and/or frequency for each reference signal resource in the first and second reference signal resource sets based on a configured time coherency parameter.

6. The transmitter node of claim 5, wherein the at least one processor is further configured to:
receive, from the receiver node, an indication for the configured time coherency parameter.

7. The transmitter node of claim 2, wherein the first and second pluralities of MIMO precoders varies over time and/or frequency for each reference signal resource in the first and second reference signal resource sets based on a configured small delay cyclic delay diversity (SDCDD).

8. The transmitter node of claim 7, wherein the at least one processor is further configured to:
receive, from the receiver node, an indication for the configured SDCDD.

9. The transmitter node of claim 2, wherein the first and second pluralities of MIMO precoders varies over time and/or frequency for each reference signal resource in the first and second reference signal resource sets based on a configured precoder cycling set and precoder cycling ordering.

10. The transmitter node of claim 9, wherein the at least one processor is further configured to:
receive, from the receiver node, an indication for the configured precoder cycling set and precoder cycling ordering.

11. The transmitter node of claim 1, wherein the at least one processor is further configured to:
receive, from the receiver node, an indication for a number of reference signal resources to include in the first and second reference signal resource sets.

12. The transmitter node of claim 1, wherein the first reference signal resource set comprises multiple reference signal resources on the same orthogonal frequency division multiplexing (OFDM) symbol in disjoint subbands of the MIMO channel.

13. The transmitter node of claim 1, wherein the first and second MIMO precoders used in each subband of the first and second subbands is a pseudo-randomly chosen MIMO precoder based on a MIMO precoder cyclic set.

14. A receiver node configured to process reference signals for positioning estimation over a multipath multiple-input multiple-output (MIMO) channel, comprising:
a memory;
at least one transceiver; and
at least one processor communicatively coupled to the memory and the at least one transceiver, the at least one processor configured to:
cause the at least one transceiver to transmit, to a transmitter node, a recommendation of a first MIMO precoder to use to encode a first reference signal resource set;
cause the at least one transceiver to transmit, to the transmitter node, a recommendation of a second MIMO precoder to use to encode a second reference signal resource set;
receive, from the transmitter node via the at least one transceiver, a first set of reference signals on the first reference signal resource set, wherein the first reference signal resource set occurs on a first subband of the MIMO channel and/or during a first time interval on the MIMO channel, and wherein each reference signal resource in the first reference signal resource set utilizes at least the first MIMO precoder;

receive, from the transmitter node via the at least one transceiver, a second set of reference signals on the second reference signal resource set, wherein the second reference signal resource set occurs on a second subband of the MIMO channel and/or during a second time interval on the MIMO channel, and wherein each reference signal resource in the second reference signal resource set utilizes at least the second MIMO precoder;

identify at least one reference signal transmitted on the first and second reference signal resource sets as following a line of sight (LOS) path between the second node and the transmitter node; and perform a time difference of arrival (TDOA) measurement based on the at least one reference signal.

15. The receiver node of claim 14, wherein each reference signal resource in the first reference signal resource set utilizes a first plurality of MIMO precoders, including the first MIMO precoder, that vary over time and/or frequency, and wherein each reference signal resource in the second reference signal resource set utilizes a second plurality of MIMO precoders, including the second MIMO precoder, that vary over time and/or frequency.

16. The receiver node of claim 15, wherein the transceiver is further configured to:

send, to the transmitter node, an indication for a configured precoder granularity, wherein the first and second pluralities of MIMO precoders varies over time and/or frequency for each reference signal resource in the first and second reference signal resource sets based on the configured precoder granularity.

17. The receiver node of claim 15, wherein the transceiver is further configured to:

send, to the transmitter node, an indication of a configured time coherency parameter, wherein the first and second pluralities of MIMO precoders varies over time and/or frequency for each reference signal resource in the first and second reference signal resource sets based on the configured time coherency parameter.

18. The receiver node of claim 15, wherein the transceiver is further configured to:

send, to the transmitter node, an indication for a configured small delay cyclic delay diversity (SDCDD), wherein the first and second pluralities of MIMO precoders varies over time and/or frequency for each reference signal resource in the first and second reference signal resource sets based on the configured SDCDD.

19. The receiver node of claim 15, wherein the transceiver is further configured to:

send, to the transmitter node, an indication for a configured precoder cycling set and precoder cycling ordering, wherein the first and second pluralities of MIMO precoders varies over time and/or frequency for each reference signal resource in the first and second reference signal resource sets based on the configured precoder cycling set and precoder cycling ordering.

20. The receiver node of claim 14, wherein the transceiver is further configured to:

send, to the transmitter node, a recommendation of a number of reference signal resources to include in the first reference signal resource set.

21. A method for transmitting reference signals for positioning estimation over a multipath multiple-input multiple-output (MIMO) channel performed by a transmitter node, comprising:

receiving, from a receiver node, a recommendation of a first MIMO precoder to use to encode a first reference signal resource set for transmission of a first set of reference signals, wherein the first reference signal resource set occurs on a first subband of the MIMO channel and/or during a first time interval on the MIMO channel, and wherein each reference signal resource in the first reference signal resource set utilizes at least the first MIMO precoder;

receiving, from the receiver node, a recommendation of a first MIMO precoder to use to encode a second reference signal resource set for transmission of a second set of reference signals, wherein the second reference signal resource set occurs on a second subband of the MIMO channel and/or during a second time interval on the MIMO channel, and wherein each reference signal resource in the second reference signal resource set utilizes at least the second MIMO precoder;

transmitting, to the receiver node over the MIMO channel, the first set of reference signals using the first reference signal resource set on the first subband of the MIMO channel and/or during the first time interval on the MIMO channel; and transmitting, to the receiver node over the MIMO channel, the second set of reference signals using the second reference signal resource set on the second subband of the MIMO channel and/or during the second time interval on the MIMO channel, wherein the transmitter node transmits the first and second sets of reference signals to assist the receiver node to perform a positioning measurement based on joint processing of the first and second sets of reference signals.

22. The method of claim 21, wherein each reference signal resource in the first reference signal resource set utilizes a first plurality of MIMO precoders, including the first MIMO precoder, that vary over time and/or frequency, and wherein each reference signal resource in the second reference signal resource set utilizes a second plurality of MIMO precoders, including the second MIMO precoder, that vary over time and/or frequency.

23. The method of claim 21, wherein the first reference signal resource set comprises multiple reference signal resources on the same orthogonal frequency division multiplexing (OFDM) symbol in disjoint subbands of the MIMO channel.

24. The method of claim 21, wherein the first and second MIMO precoders used in each subband of the first and second subbands is a pseudo-randomly chosen MIMO precoder based on a MIMO precoder cyclic set.

25. A method for processing reference signals for positioning estimation over a multipath multiple-input multiple-output (MIMO) channel performed by a receiver node, comprising:

transmitting, to a transmitter node, a recommendation of a first MIMO precoder to use to encode a first reference signal resource set;

transmitting, to the transmitter node, a recommendation of a second MIMO precoder to use to encode a second reference signal resource set;

receiving, from the transmitter node, a first set of reference signals on a first reference signal resource set, wherein the first reference signal resource set occurs on a first subband of the MIMO channel and/or during a first time interval on the MIMO channel, and wherein each reference signal resource in the first reference signal resource set utilizes at least the first MIMO precoder;

receiving, from the transmitter node, a second set of reference signals on a second reference signal resource set, wherein the second reference signal resource set occurs on a second subband of the MIMO channel and/or during a second time interval on the MIMO channel, and wherein each reference signal resource in the second reference signal resource set utilizes at least the second MIMO precoder;

identifying at least one reference signal transmitted on the first and second reference signal resource sets as following a line of sight (LOS) path between the receiver node and the transmitter node; and performing a time difference of arrival (TDOA) measurement based on the at least one reference signal.

26. The method of claim 25, wherein each reference signal resource in the first reference signal resource set utilizes a first plurality of MIMO precoders, including the first MIMO precoder, that vary over time and/or frequency, and wherein each reference signal resource in the second reference signal resource set utilizes a second plurality of MIMO precoders, including the second MIMO precoder, that vary over time and/or frequency.

27. The method of claim 25, further comprising:

sending, to the transmitter node by the receiver node, a recommendation of a number of reference signal resources to include in the first reference signal resource set.

* * * * *